DAVID BEZBORODKO
CHARLES ZUCKER
Inventors:
By Haseltine, Lake & Co.
Attorneys

DAVID BEZBORODKO
CHARLES ZUCKER
Inventors:

By Haseltine, Lake & Co.
Attorneys

Feb. 15, 1944.  D. BEZBORODKO ET AL  2,341,524
COMBINED MACHINE FOR SURFACE GRINDING AND
POLISHING GLASS AND OTHER MATERIALS
Filed May 27, 1941   8 Sheets-Sheet 6
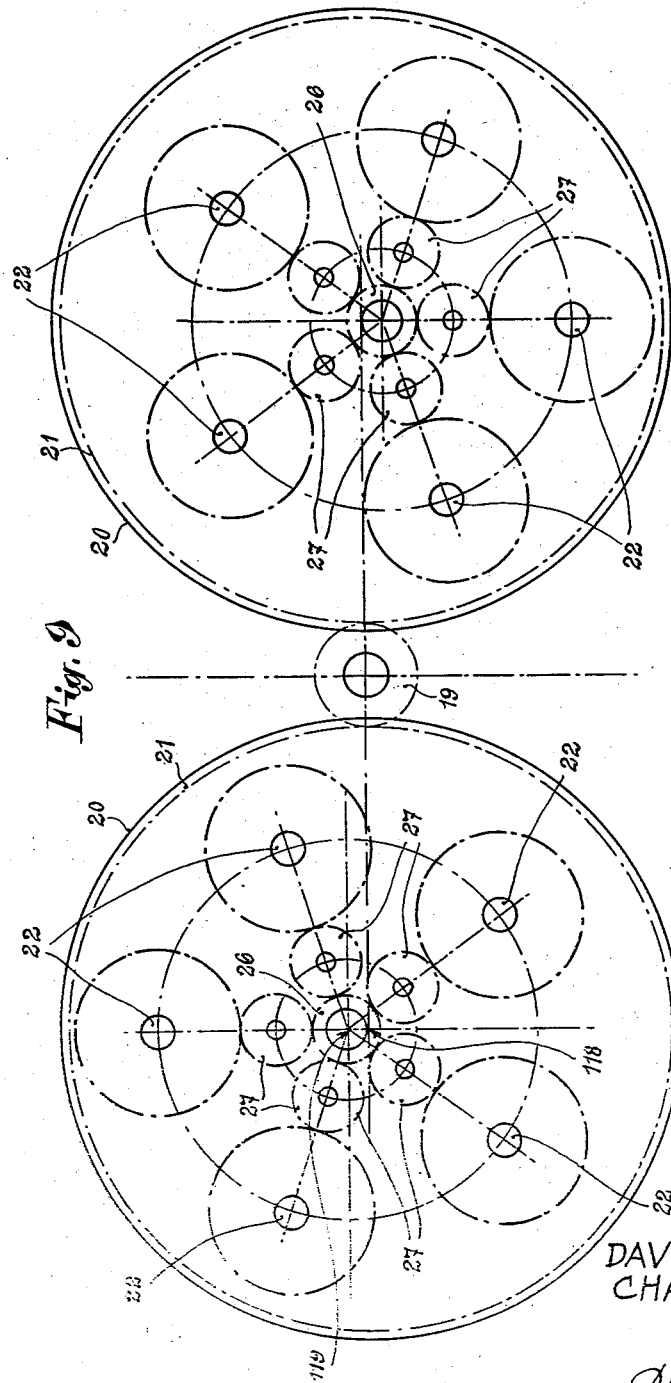
DAVID BEZBORODKO
CHARLES ZUCKER
Inventors:
By Haseltine, Lake Co.
Attorneys

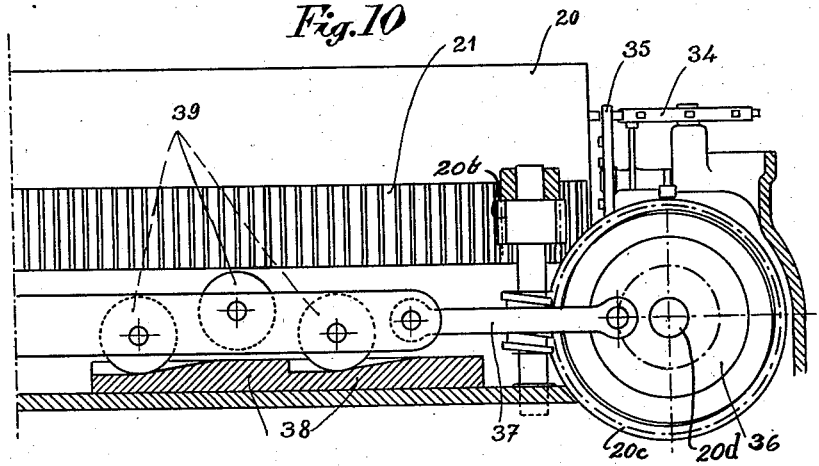
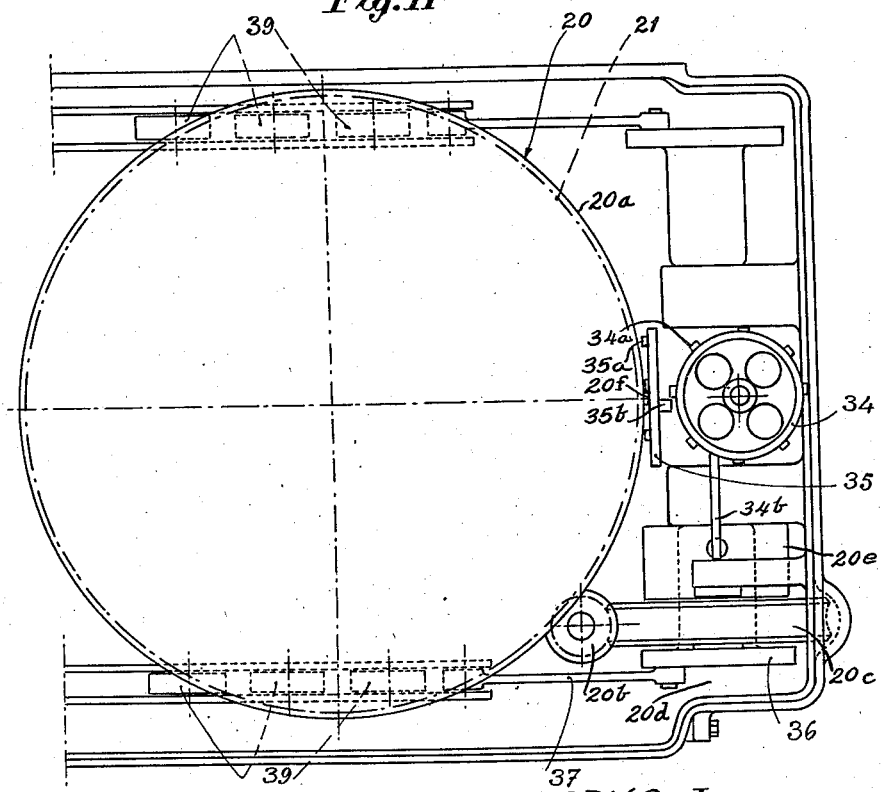

Feb. 15, 1944. D. BEZBORODKO ET AL 2,341,524
COMBINED MACHINE FOR SURFACE GRINDING AND
POLISHING GLASS AND OTHER MATERIALS
Filed May 27, 1941 8 Sheets-Sheet 8
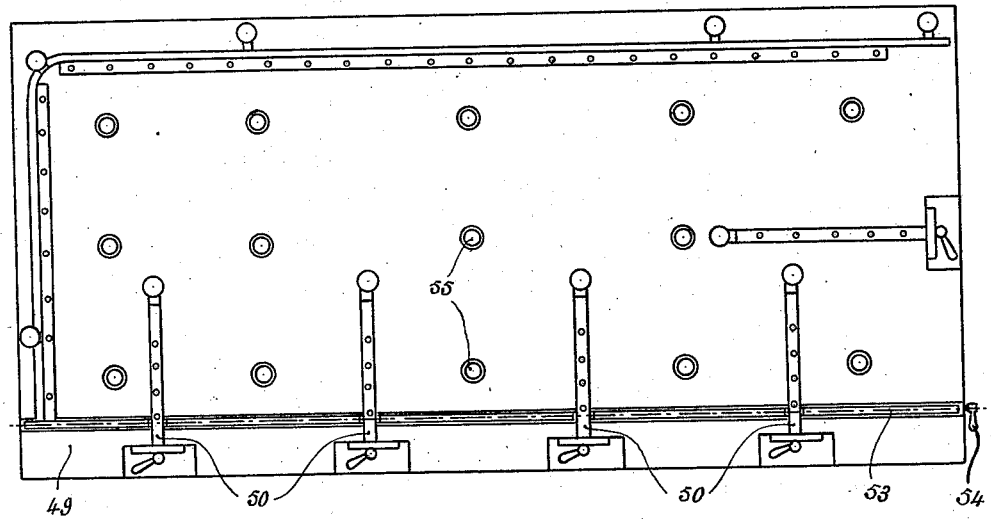
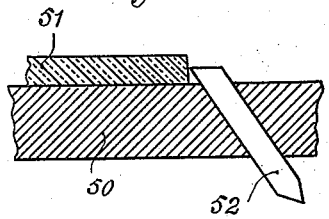
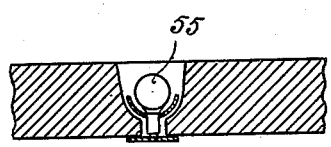
DAVID BEZBORODKO
CHARLES ZUCKER
Inventors:
By Haseltine Lake & Co.
Attorneys Patented Feb. 15, 1944

2,341,524

UNITED STATES PATENT OFFICE 2,341,524

COMBINED MACHINE FOR SURFACE GRIND-
ING AND POLISHING GLASS AND OTHER
MATERIALS

David Bezborodko and Charles Zucker, Nice,
France; vested in the Alien Property Custodian Application May 27, 1941, Serial No. 395,384
In France September 26, 1940

8 Claims. (Cl. 51—56)

The surface grinding and polishing treatment of glass, the object of which is to remove all the waves or other inequalities on the surface of the glass, is effected by removing on both faces of the glass plate a thickness which was previously valued in a very approximative manner. By making use of this method, a too thick glass layer is removed, sometimes without any necessity, because the operator is forced to start from a very considerable depth. Abrasive materials of decreasing sizes must then be used and care must be taken during the various operations. Two surface grinding processes are currently used. According to one, the square glasses are treated on round tables, however this treatment brings about a loss of 20 to 40% of materials and a great consumption of electricity because of the particular construction of these tables. The wedging or blocking as well as the loosening of the glass on the table equally necessitate much labor.

The second process called a continuous process saves some of the driving power and a great deal of labor. However, in spite of the fact that a great quantity of material is removed when the second process is applied to the laminated or drawn out glass, it is impossible to suppress waves which are of uneven depths. In this process, the defects can be seen only after the finishing and this manufacturing system gives but very little of silverplatable glass. It is chiefly used for carriage-glass plates. Another drawback of this process is its very expensive installation, because it requires the use of thousands of tons of cast-iron and uses a great amount of labor. Its use is justified only when the production is very great and it cannot be used in countries consummating small quantities of plate glass.

The combined machine for surface grinding and polishing glass which constitutes the object of this invention performs, in an ordered manner, all the motions executed by a hand-polisher. It eliminates all the drawbacks mentioned above and may be used for the treatment of other materials such as marble, metals, and wood. It offers the advantage of lowering the cost-price of the surface grinding and polishing treatment of glasses and may be applied even without abrasive materials by using natural or artificial grind-stones. Owing to the new process the installation costs of a plate glass factory are greatly lowered.

With this machine it is possible to effect both surface grinding and polishing.

It is essentially characterized by the fact that it comprises the following elements taken together or separately:

(a) A device supporting a vertically movable frame and means, such as a hydraulic piston for moving the frame, the said frame supporting the surface grinding and polishing organs for the glass.

(b) A surface grinding device supported by a frame effectuating a transversal to-and-fro horizontal motion and bearing only one planing wheel fixed in the centre of the said frame and receiving a rotation motion from a motor, this planing wheel being regularly fed with abrasive matter which is directed onto a glass plate fixed on a table beneath the planing wheel, the table also being reciprocated with a longitudinal motion. The planing wheel is resiliently pressed on the glass undergoing treatment.

(c) A polishing device comprising two or more groups of polishing wheels supported by the same frame describing a horizontal motion that bears the surface grinding device, these wheels rubbing on the glass plate with a graduated pressure which may be regulated by resilient means such as rubber disks. These wheels, in combination with the glass plate moving longitudinally with its support, describe six various motions forming a mosaic, and are raised periodically for the airing of the felt disks and to permit feeding of putty or abrasive mixture to the work-piece.

This invention also refers to a certain number of accessory devices to be used more particularly but not exclusively with this machine.

Thus, this combined machine for surface grinding and polishing may be used with a table supporting the glass, the to-and-fro or reciprocating motion of which is controlled by the aid of a known device, said table comprising two parts the one of which may have its longitudinal movement controlled by the aid of an individual motor, the other part of the table directly supporting the glass and being provided with cleats for securing the glass thereto, and means comprising a cam fixed in the thickness of the table on the whole of its length to facilitate removal of the glass. Electric lamps, colored if necessary, may be arranged in the said table to control the planing of the glass. Small channels for the recovering of the waste abrasive matter as well as a protecting device surround the table supporting the glass.

With this machine and this table and by making use of any known or unknown device, the planing wheel may be fed with liquid abrasive matter across the disk.

It may also be fed from the exterior and even by the aid of dry abrasive matter distributed automatically by the longitudinal displacing motion of the table. Experience has shown that when working in the indicated manner, it is possible to realize a 20%-25% greater biting on the glass and consequently a corresponding economy in driving power. The formation of small protuberances which sometimes hinder the wheel from being in contact with the glass on the whole surface is thus avoided.

This invention includes, moreover, any other machine for surface grinding and polishing glasses comprising, in totality or in part, the application of similar arrangements.

It will be well understood, in any manner, by the aid of the description given hereafter and the annexed drawings given only by way of example.

Figure 5:
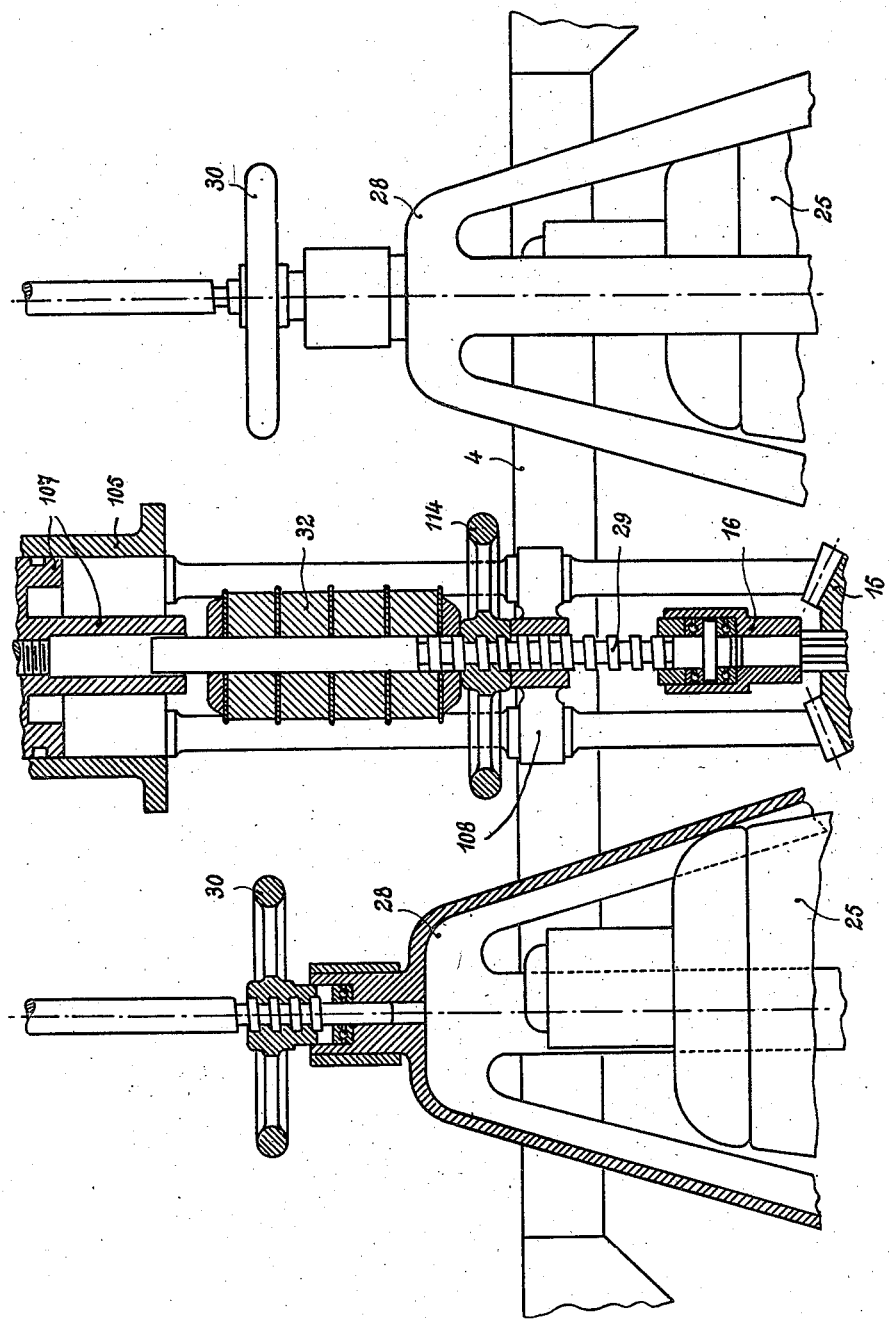

Fig. 5, on a greater scale, gives a view of the bells and of the regulating devices for the pressure of the polishing wheels.

Figure 6:
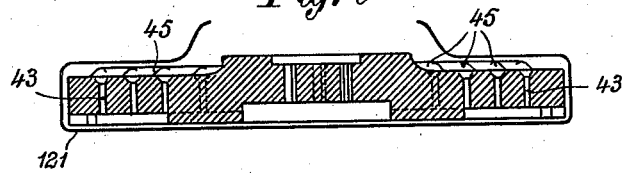
Figure 7:
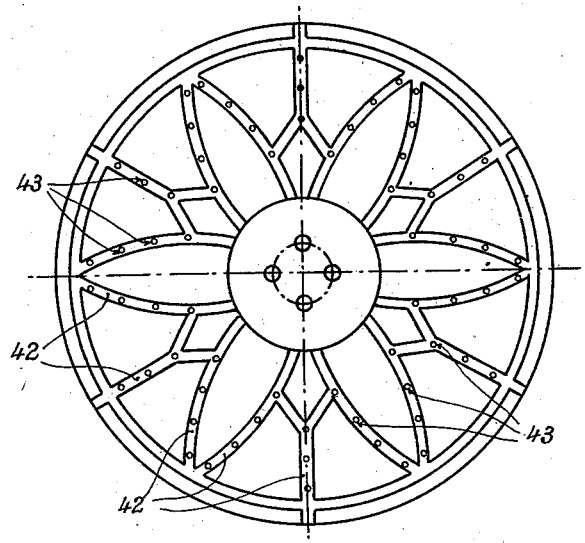

Figs. 6 and 7 are views of the polishing wheel respectively in section along the line 6—6 of the Fig. 7 and in plan seen underneath.

Figure 8:
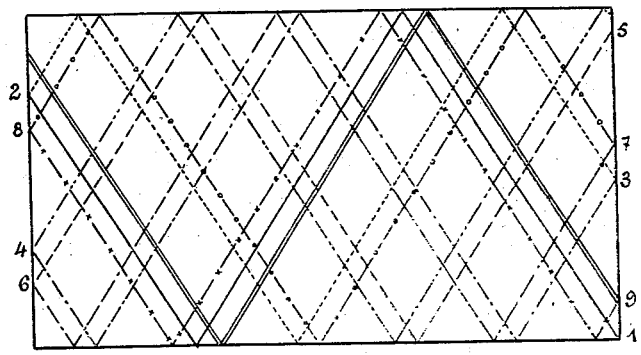

Fig. 8 is a diagrammatic representation of the lines of motion having the shape of a mosaic described by a polishing wheel.

Fig. 9 is a schematic view giving the arrangement of the polishing spindles in the drums and their controlling device.

Figs. 10 and 11 are enlarged schematic views respectively in elevation and in plan showing the airing mechanism of the polishing wheels.

Fig. 12 is a schematic view of the table supporting the glass.

Figs. 13 and 14 are enlarged detail views of the cleats and the lamps placed in the cleats or recesses of the table supporting the glass.

Figure 3:
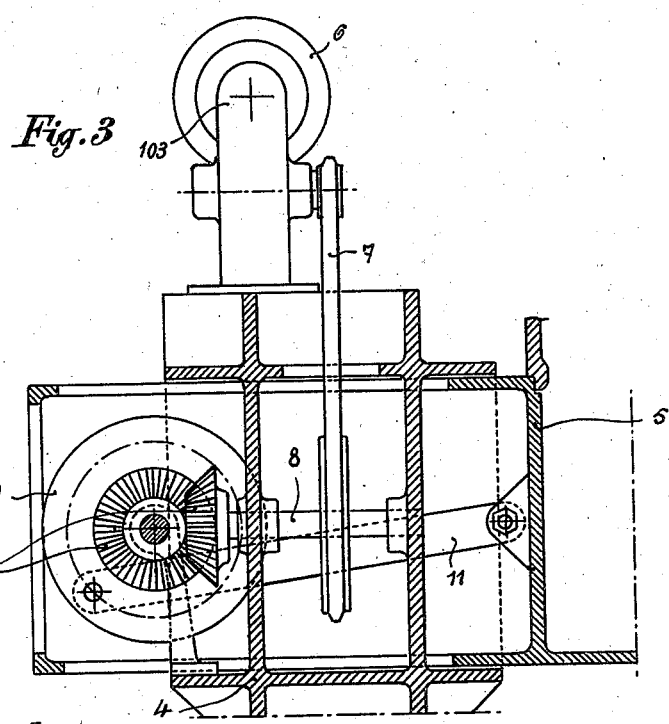
Figs. 3 and 4 are schematical views respectively elevation and plan views of the controlling device of the frame supporting the drums.
Figure 4:
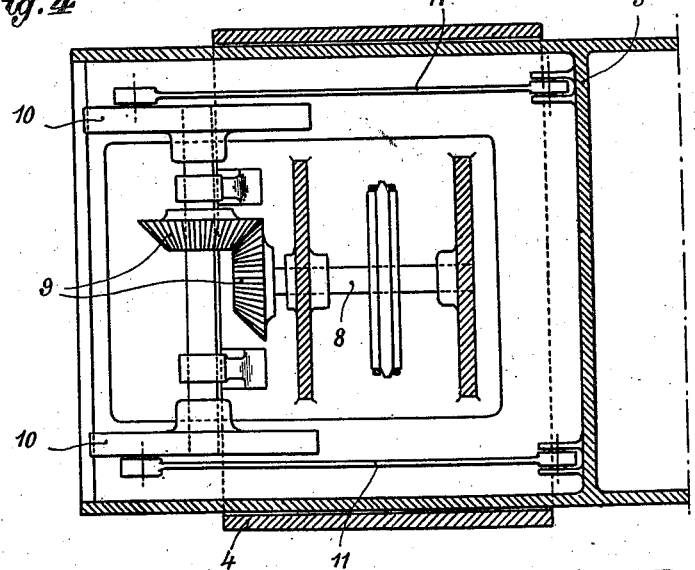

The machine is arranged on the fixed frame 2 comprising two guiding columns 3 between which a frame 4 may move vertically under the action of a hydraulic piston 102 or of any other suitable device; a frame 5 supporting all the grinding and polishing organs and any other controlling mechanism may move horizontally in the frame 4. The to-and-fro motion or reciprocation of the frame 5 (Figs. 3 and 4) is obtained by the aid of a mechanism supported by the frame 4. It comprises a motor 6 with the reduction gear 103 which controls, by the aid of the chain 7, a shaft 8 on the extremity of which a couple of bevel pinions 9 act upon two adjustable disk cranks 10, the connecting rods 11 of which impart to the frame 5 a horizontal motion the course of which may be regulated by displacing, on the said disk cranks 10, the oscillating point of the head of the connecting rods.

The frame 5 supports the complete grinding and polishing mechanism which comprises a motor 12 (Fig. 2) arranged on an upper platform 13. This motor acts, by the intermediary of belts or of a couple of cylindrical gears 14 and of a couple of bevel pinions 15 on a central shaft 16 on the lower extremity of which is fixed a plate 17 supporting the planing wheel 18.

The feeding of this wheel with abrasive matter is realized with the aid of dry abrasive. It is controlled by the motion of the table 49 and comprises, for instance, two funnels 104 and 105 opening alternatively, that on the right when the table travels to the right and that on the left when the table moves to the left; these openings may, moreover, be regulated according to the width of the glass to be worked.

For the surface grinding of the glass, the planing wheel 18 is lowered to its contact by opening the valve 113 which controls the piston 102. Then, with the aid of the hand wheel 114, the upper extremity of the shaft 16 is brought into contact with the piston 107 which is movable in the cylinder 115, its motion being controlled by the aid of the valve 106, which opens or shuts the admission and the discharge pipes 116, 117 for water under pressure. The descent of the piston 107 compresses rubber disks 32 thus bringing about the desired resilient pressure of the wheel 18 on the glass.

The surface grinding of the glass is followed by the polishing which is realized by the same machine. For this purpose the planing wheel 18 is raised and dismounted. The polishing wheels 24 are then lowered close to the glass.

The central shaft 16 bears in its middle part a pinion 19 having a long bushing 19' which serves to drive the polishing mechanism. The latter is comprised in two drums 20 arranged on each side of the central shaft 16 bearing on its upper part a crown wheel 21 brought into gearing with the pinion 19 by raising the central shaft 16 by means of hand wheel 114 and screw 29 after the planing of the glass, when the planing wheel 18 is dismounted.

Figure 2:
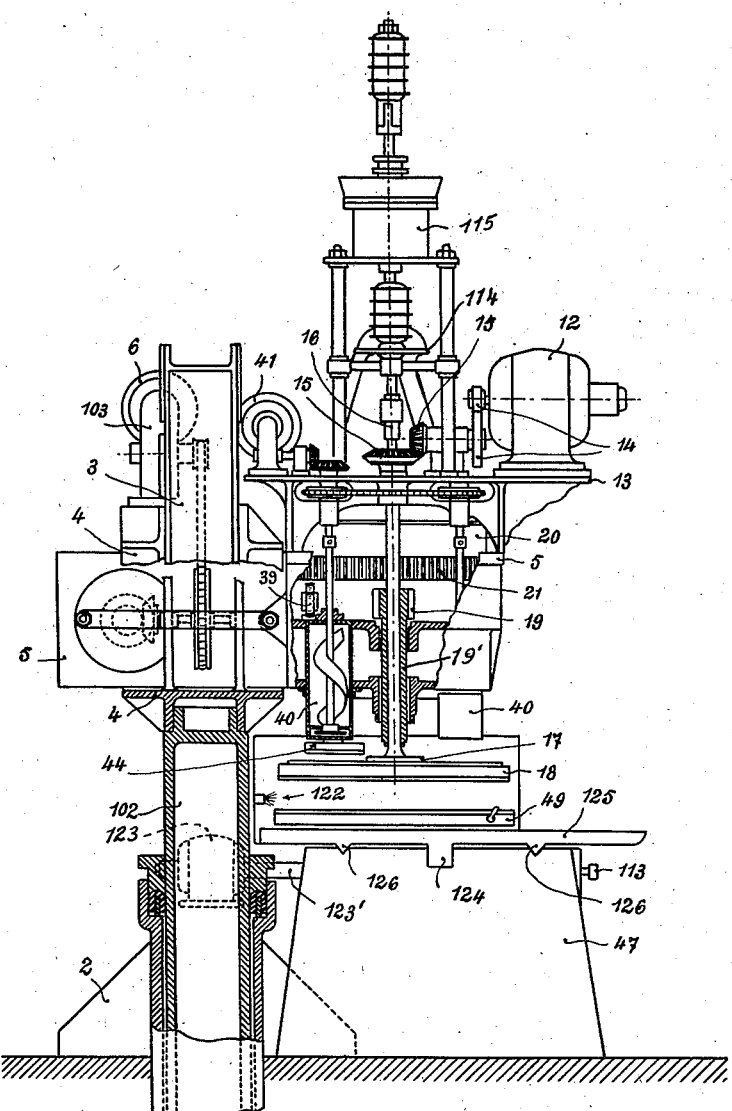

The drums 20 then perform a rotation motion round their axes 118. In the described machine, each of them comprises five spindles 22; and each spindle bears a vertical pinion 23 on its upper part and a polishing wheel 24 on its lower part. These spindles 22 are arranged at various distances from the axle of the drum 20 (Fig. 2). For the driving of the polishing wheels there is arranged on the upper part of each drum 20 a vertical motor 25 the axis 119 of which is eccentric with respect to that of 118 of the drums 20 and which serves to impart, through the suitable gears 26 and 27, a proper rotation to the spindles 22.

The whole of the drum with spindles and polishing wheels and driving motors is rigidly connected with a bell 28. A connection through regulating screws 29, regulating fly-wheel 30 and connecting tie 120 is secured between the two bells 28 and a resilient pressure means constituted by an upper group 31 of rubber disks.

This system supplements the action of the springs 33 fixed on each spindle and serving to cushion the shock just as all the spindles come in contact with the glass. It is driven by the aid of a hydraulic piston 107 controlled by a valve 106 or in any other suitable manner and serves to obtain a graduated supple pressure from the polishing wheels, this pressure being determined as a function of the work to be accomplished.

The airing of the polishing wheels takes place, for instance every 45 revolutions described by the drums 20. This movement is effected as follows: The drum 20 carries an external gear 20ª meshing with a pinion 20ᵇ which in turn meshes with a worm 20ᶜ fast upon a shaft 20ᵈ supported in a bracket 20ᵉ. The worm 20ᶜ and shaft 20ᵈ therefore are continuously rotated by drum 20. The latter has a tooth 20ᶠ adapted to engage on each revolution of the drum with one of a plurality of teeth 35ª carried on one face of a disc 35, the opposite face of which has a tooth 35ᵇ engageable on each complete revolution of disc 35 with one of a plurality of teeth 34ª of another rotatable disc 34 so arranged that on each complete revolution of disc 34 it causes a pivoted lever 34ᵇ momentarily to clutch a crank disc 36 to shaft 20ᵈ. Crank disc 36 is connected by connecting rods 37 to carriages 39 and causes them to move on the double inclines 38. The carriages 39 are connected respectively with the drums 20 which are accordingly raised and lowered periodically carrying with them the polishing wheels 24. By suitably selecting the number of teeth on discs 34 and 35 the drums can be raised after any desired number of revolutions.

The pressure of the tools on the glass may also be regulated by the aid of a clockwork which controls the upwards and the downwards motion of the drums and the compression, or by the aid of an electromagnet acting upon the valve 128 of the cylinder 115 of the piston 107 for shutting it after the descent of the drums in order to compress the rubber disks and to open it to release them before their upwards motion.

The feeding of the polishing wheels of each drum is effected with more or less fluid polishing compound mixed by two mixers 40 arranged in the frame. The mixers are brought into motion, in a continuous manner, by the aid of a motor 41 arranged on the upper part of the frame 5, through suitable gearing. At their lower part is arranged a stop-valve 44 alternately opening and shutting their evacuation orifices at the lower part of each mixer. It is controlled by the ascending and descending mechanism of the polishing wheels in order to cause to fall on the glass, at each elevation of the wheel, the necessary layer of very diluted virgin putty. The mixer is heated electrically in order that the polishing material may be brought to a temperature sufficient to prevent the breaking of the glass during the feeding.

In order to secure its feeding with liquid, the planing wheel (Figs. 6 and 7) is provided, at the lower part, with a certain number of grooves 42 uniformly distributed under it as shown on Fig. 7 and in the bottom of which are bored holes 43 which extend through the said wheel.

Members 45, located upon the upper surface of the polishing wheel, are employed to prevent the abrasive liquid or slurry from being thrown off of the wheel.

The polishing is carried out mechanically by the combination of six various motions:

1. A longitudinal motion of the table supporting the glass.
2. A transversal motion of the frame supporting the drums.
3. A rotary motion of the drum supporting the wheels.
4. A rotary motion of each polishing wheel.
5. An eccentric rotation motion of the whole of the groups, each of these comprising five wheels.
6. The airing motion by the elevation and descent of the drums.

All these motions cause a displacing of each of the polishing wheels so that the whole constitutes a mosaic.

Fig. 8 gives a theoretical outline, in form of a mosaic, of nine runs of the polishing wheel, the order of these runs being noted by the aid of the figures represented on this diagram.

This outline results from the combination of the longitudinal displacing motion of the table supporting the glass, on the one hand, and of the transversal displacing of the frame supporting the polishing tools, on the other hand.

In order to permit the abrasive matter in the grooves of the planing wheel from falling upon the table 125, when the glass is changed, a cover 121 (Fig. 6) is then placed on these wheels.

Figure 1:
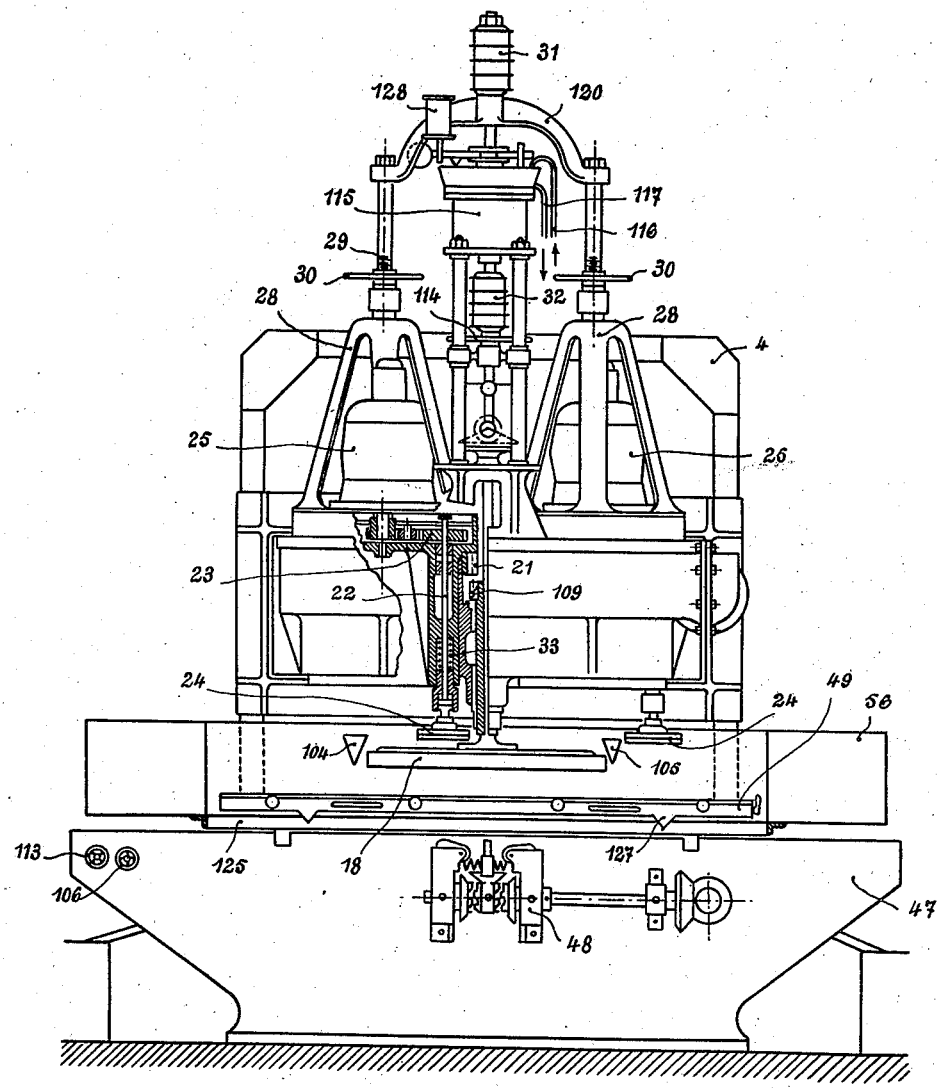
Figs. 1 and 2 are elevation views respectively front and side views of the machine, with partial section.

The glass supporting table is shown in Figures 1, 2 and 12 and comprises a conventional reciprocating device comprising a rack and pinion device 124 driven from shaft 123' of motor 123. 48 indicates a conventional clutching mechanism for reversing the direction of movement of the table which is guided in its longitudinal movements by slides 126 working in grooves in the base 47.

The plate 49 provided with a system of sliding bars 50 is placed on the carriage 125. The glass is secured mechanically by the means of cleats 52 provided in the sliding bars 50 (Figs. 12 and 13).

The plate 49 is movable in the slide 127 perpendicularly to the carriage 125.

The border of the table as well as the under part are surrounded by grooves to receive surplus water and waste abrasive matter.

A cam mounted in a groove 53 (Fig. 12) running along the whole length of the table is provided for the instantaneous lifting of the glass without any risk of breaking it even if it be very thin. This cam is controlled by the aid of a hand-lever 54 arranged on the side.

Electric lamps 55 (Figs. 12 and 14) are fixed in the table supporting the glass and serve to control the planing of the glass during the work.

Finally, a protecting device or pan 56 (Fig. 1) surrounding the table contributes to the recovering of the abrasive matter, prevents accidents and protects the mechanical parts of the machine, and enables the workman to work without getting dirty.

Brushes such as 122 for the cleaning of the felt disks may be seen in certain parts of the frame.

It is clear that the invention is nowise limited by the example given above nor by the various parts described, but comprises, on the contrary, all possible variants. The planing and the polishing in particulars may be realized on two distinct machines in which application is made of the arrangements given above. This execution manner may present some advantages in the more important installations where considerable quantities of glass are to be polished.

What we claim is:

1. A combined machine for surface grinding and polishing glass and other materials characterized in that it has a polishing device comprising two or more groups of polishing wheels supported by the same frame describing horizontal motions that bears the grinding device, these wheels rubbing on the glass plate with a graduated pressure controllable by the aid of valves and made supple by the compression of rubber rounds, these wheels describing in combination with the glass plate moving longitudinally with its support, six various motions the whole of which corresponds to a mosaic, and being raised periodically, the feeding in grinding mixture taking place during the ascending period.

2. A machine for surface grinding and polishing glass and other materials comprising a horizontally reciprocable frame, a grinding wheel carried by said frame, a plurality of groups of polishing wheels carried by said frame, a horizontally reciprocable support for the material to be polished, means for controlling the pressure of said polishing wheels on said material, means for rotating each polishing wheel about its own axis, means for rotating each group of polishing wheels about an axis common to said group, means for reciprocating said frame, means for reciprocating said material support transversely to the direction of reciprocation of said frame, means for raising and lowering said groups of polishing wheels periodically, and periodically operating means for feeding fluid polishing compound periodically to the surface to be polished during the intervals when said polishing wheels are in raised position.

3. A machine for surface grinding and polishing glass and other material comprising a vertically movable frame, hydraulic means for controlling the vertical movements of said frame, a second frame horizontally reciprocable on said vertically movable frame, a motor and connections therewith to reciprocate said second frame, a grinding wheel removably supported from said second frame, a grinding wheel removably supported from said second frame, a plurality of groups of polishing wheels also supported from said second frame, means for rotating each polishing wheel about its own axis, means for rotating each group of polishing wheels about a common axis, a material support and means to horizontally reciprocate said support in a direction transverse to the direction of reciprocation of the said second frame.

4. A machine for surface grinding and polishing glass and other material comprising a vertically movable frame, hydraulic means for controlling the vertical movements of said frame, a second frame horizontally reciprocable on said vertically movable frame, a motor and connections therewith to reciprocate said second frame, a grinding wheel shiftably supported from said second frame, a plurality of groups of polishing wheels also supported from said second frame, means for rotating each polishing wheel about its own axis, means for rotating each group of polishing wheels about a common axis, a material or workpiece support and means for horizontally reciprocating said support in a direction transverse to the direction of reciprocation of the said second frame, said support being common to the grinding wheel and the polishing wheels, means allowing the grinding wheel to be shifted out of contact with the workpiece and replaced by the polishing wheels in active contact with said workpiece, and vice versa, and means controlled by the movement of said material support for feeding polishing compound to the material to be polished.

5. A machine for surface grinding and polishing glass and other material comprising a vertically movable frame, hydraulic means for controlling the vertical movement of said frame, a second frame horizontally reciprocable on said vertically movable frame, a motor and connections therewith to reciprocate said second frame, a grinding wheel removably supported from said second frame, a plurality of groups of polishing wheels also supported from said second frame, means for rotating each polishing wheel about its own axis, means for rotating each group of polishing wheels about a common axis, a material support and means to horizontally reciprocate said support in a direction transverse to the direction of reciprocation of the said second frame, a groove extending lengthwise of said support, a cam in said groove and manually operable means for actuating said cam to raise the material from said support.

6. A machine for surface grinding and polishing glass and other material comprising a vertically movable frame, hydraulic means for controlling the vertical movements of said frame, a second frame horizontally reciprocable on said vertically movable frame, a motor and connections therewith to reciprocate said second frame, a grinding wheel removably supported from said second frame, a plurality of groups of polishing wheels also supported from said second frame, means for rotating each polishing wheel about its own axis, means for rotating each group of polishing wheels about a common axis, a material support and means for horizontally reciprocating said support in a direction transverse to the direction of reciprocation of the said second frame, a recess in said support, an electric lamp in said recess, and abrasive collecting grooves also in said support.

7. A machine for surface grinding and polishing glass and other material comprising a vertically movable frame, hydraulic means for controlling the vertical movements of said frame, a second frame horizontally reciprocable on said vertically movable frame, a motor and connections therewith to reciprocate said second frame, a grinding wheel removably supported from said second frame, a plurality of groups of polishing wheels also supported from said second frame, means for rotating each polishing wheel about its own axis, means for rotating each group of polishing wheels about a common axis, a plurality of brushes mounted for automatically cleaning the polishing wheels, a material support and means to horizontally reciprocate said support in a direction transverse to the direction of reciprocation of the said second frame.

8. A machine as claimed in claim 7 wherein the means for controlling the pressure of the polishing wheels on the material comprise a hydraulically actuated piston, and a plurality of superposed rubber discs between said piston and said polishing wheels and acting to progressively yieldingly transmit the piston pressure to said polishing wheels.

DAVID BEZBORODKO.
CHARLES ZUCKER.